US012562081B2

(12) United States Patent
Zhang et al.

(10) Patent No.: US 12,562,081 B2
(45) Date of Patent: Feb. 24, 2026

(54) SOLAR ELECTRONIC SHELF LABEL (AMENDED)

(71) Applicant: Hanshow Technology Co., Ltd., Zhejiang (CN)

(72) Inventors: Xiaofei Zhang, Zhejiang (CN); Linjiang Wang, Zhejiang (CN); Yanwei Wang, Zhejiang (CN); Jianguo Zhao, Zhejiang (CN); Shiguo Hou, Zhejiang (CN)

(73) Assignee: Hanshow Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/834,105

(22) PCT Filed: Jan. 28, 2022

(86) PCT No.: PCT/CN2022/074687
§ 371 (c)(1),
(2) Date: Jul. 29, 2024

(87) PCT Pub. No.: WO2023/141968
PCT Pub. Date: Aug. 3, 2023

(65) Prior Publication Data
US 2025/0124824 A1     Apr. 17, 2025

(51) Int. Cl.
*G09F 3/20* (2006.01)
*G06K 19/07* (2006.01)

(52) U.S. Cl.
CPC ........... *G09F 3/208* (2013.01); *G06K 19/071* (2013.01)

(58) Field of Classification Search
CPC .......... G09F 3/208; G09F 7/10; G06K 19/071
See application file for complete search history.

(56) References Cited

U.S. PATENT DOCUMENTS 10,706,749 B1 *  7/2020  White ..................... G09F 3/204
2011/0286195 A1 *  11/2011  Horikiri ................... G09F 7/10
361/807

(Continued)

FOREIGN PATENT DOCUMENTS

CN          201765774 U          3/2011
CN          210144306 U          3/2020
(Continued)

OTHER PUBLICATIONS

International Searching Authority, "International Search Report," issued in connection with International Application No. PCT/CN2022/074687, dated Sep. 28, 2022, 7 pages.

(Continued)

*Primary Examiner* — Priyank J Shah
(74) *Attorney, Agent, or Firm* — Hanley, Flight & Zimmerman, LLC

(57) ABSTRACT

The present disclosure provides a solar electronic shelf label, including a rear shell, a front part of which is provided with a screen. A control panel is disposed between the rear shell and the screen, and a control signal output terminal of the control panel is connected to a control terminal of the screen. The rear shell is provided with a solar panel, and is formed with a wiring groove extended to an end face of the front part of the rear shell. A lead is arranged in the wiring groove, the solar panel is connected to the control panel through the lead, and the control panel is connected to the screen. The present disclosure solves the technical problem that the service life of the electronic shelf label is affected by the limited battery capacity.

18 Claims, 4 Drawing Sheets

(56)    References Cited

U.S. PATENT DOCUMENTS

| | | | |
|---|---|---|---|
| 2016/0260163 A1* | 9/2016 | Sjödin | G09F 3/208 |
| 2021/0012634 A1* | 1/2021 | Claeys | E05B 47/0012 |
| 2021/0043117 A1 | 2/2021 | White et al. | |

FOREIGN PATENT DOCUMENTS

| | | | |
|---|---|---|---|
| CN | 211294582 U | 8/2020 | |
| CN | 212302528 U | 1/2021 | |
| CN | 213211061 U | 5/2021 | |
| CN | 215371976 U | 12/2021 | |
| JP | 3099908 U | 12/2003 | |
| JP | 2005264483 A | 9/2005 | |
| JP | 2010110506 A | 5/2010 | |
| JP | 2011041351 A | 2/2011 | |
| JP | 2012181454 A | 9/2012 | |
| JP | 2016096927 A | 5/2016 | |
| JP | 5955926 B2 * | 7/2016 | G09F 3/208 |
| KR | 20190084784 A | 7/2019 | |

OTHER PUBLICATIONS

International Searching Authority, "Written Opinion," issued in connection with International Application No. PCT/CN2022/074687, dated Sep. 28, 2022, 9 pages.

Japan Patent Office, "First Office Action" issued for corresponding Japanese Patent Application 2024-526577 mailed on Jul. 1, 2025, 9 pages (English Translation Included).

IP Australia, "Examination Report 1", issued on Aug. 1, 2025 for counterpart Australian Patent Application No. 2022437531, 3 pages.

European Patent Office, "Extended European Search Report," issued in connection with European Patent Application No. 22922808.5, dated Nov. 3, 2025, 10 pages.

* cited by examiner

SOLAR ELECTRONIC SHELF LABEL (AMENDED)

CROSS-REFERENCE TO RELATED APPLICATION

This Patent arises from a U.S. National Stage of International Application No. PCT/CN2022/074687, filed Jan. 28, 2022, which is hereby incorporated by reference in its entirety.

TECHNICAL FIELD

The present disclosure relates to the field of electronic products, further relates to a solar electronic shelf label, and particularly to an electronic shelf label supporting solar energy collection and power supplying.

BACKGROUND

The power supplying mode of the existing electronic shelf labels is usually battery power supplying or active power supplying.

In the battery power supplying mode, a button battery or a pouch battery is generally assembled with a plastic battery case as a whole, and then the battery case is connected to a main body of a rear shell through a structure such as a buckle. However, the limited capacity and limited service life of the battery will affect the service life of the electronic shelf label and limit the use time thereof. In the active power supplying mode, the electronic shelf label is connected to an active guide rail, so as to introduce a DC power source for power supplying. However, this power supplying mode requires complicated wiring and assembling operations, and has the disadvantages such as poor safety, high cost, and large volume of the shelf label that affects the flexibility of use.

SUMMARY

The present disclosure aims to provide a solar electronic shelf label, which can collect light energy for powering the electronic shelf label, thereby eliminating the need for a separate battery or connection to an external power source, improving the use safety, and prolonging the service life.

The above objective of the present disclosure can be achieved by adopting the following technical solution.

The present disclosure provides a solar electronic shelf label, including a rear shell, a front part of which is provided with a screen. A control panel is disposed between the rear shell and the screen, and a control signal output terminal of the control panel is connected to a control terminal of the screen. The rear shell is provided with a solar panel and is formed with a wiring groove extended to an end face of the front part of the rear shell, a lead is arranged in the wiring groove, the solar panel is connected to the control panel through the lead, and the control panel is connected to the screen.

The present disclosure has the following advantageous effects.

In the solar electronic shelf label, a front part of a rear shell is provided with a control panel and a screen, the rear shell is provided with a solar panel, a wiring groove is extended from a mounting position of the solar panel to an end face of the front part of the rear shell, so that a lead can pass through the wiring groove to connect the solar panel with the control panel, and the screen is controlled by the control panel to display commodity information, thereby ensuring the normal work of the electronic shelf label.

The solar electronic shelf label adopts the solar panel as a power source, so that the service life of the electronic shelf label is not limited by the battery capacity, thereby prolonging the service life of the electronic shelf label.

The solar electronic shelf label book is compact in size and simple in structure, which is convenient for the mounting and position adjustment of the electronic shelf label and confers superior applicability to the electronic shelf label.

BRIEF DESCRIPTION OF DRAWINGS

The following drawings are only intended to schematically illustrate and explain the present disclosure, rather than limiting the scope thereof. In the drawings.

DETAILED DESCRIPTION OF EMBODIMENTS

Figure 1:
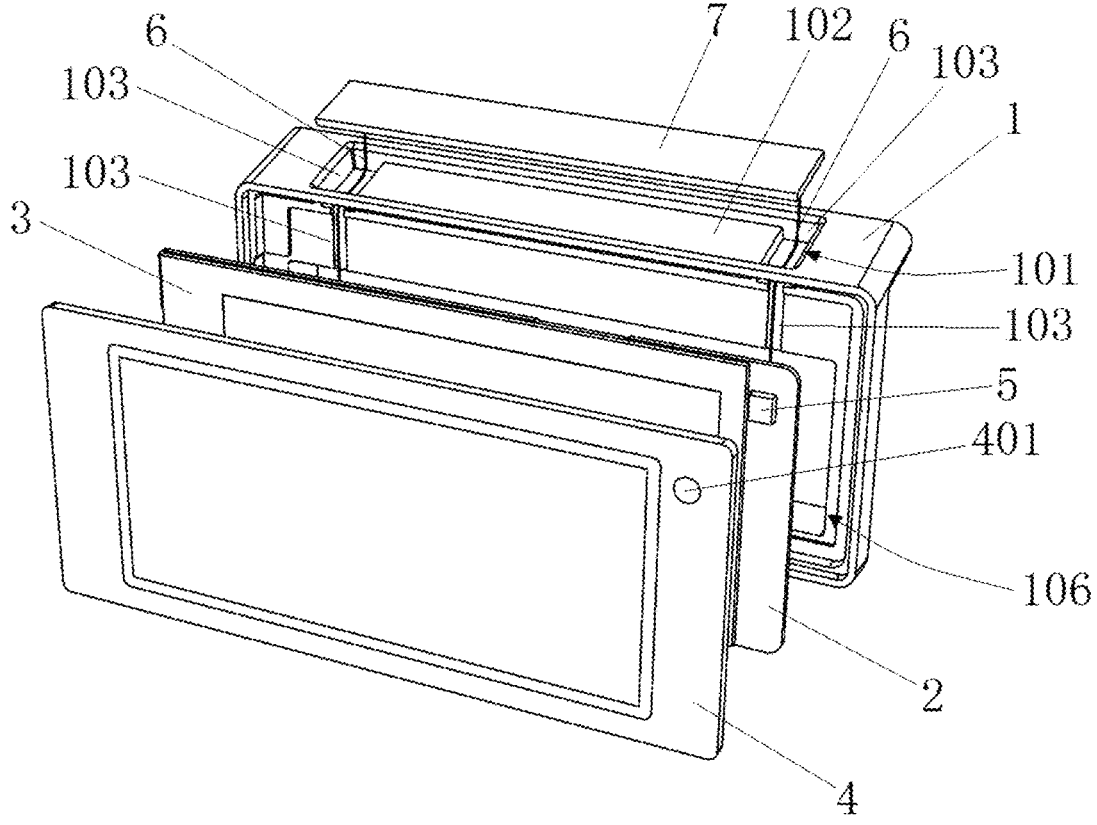
FIG. 1 illustrates a structural diagram of a solar electronic shelf label of the present disclosure in a disassembled state.

For a clearer understanding of the technical features, objectives and effects of the present disclosure, specific embodiments of the present disclosure will now be described with reference to the drawings. Unless indicated directions are defined separately, any direction such as upward, downward, forward and backward mentioned herein are all based on those illustrated in FIG. 1 of the present disclosure, which are explained here together.

As illustrated in FIGS. 1 to 4, the present disclosure provides a solar electronic shelf label, including a rear shell 1, a front part of which is provided with a screen 3. A control panel 2 is fixedly disposed between the rear shell 1 and the screen 3. A control signal output terminal of the control panel 2 is connected to a control terminal of the screen 3, and the control panel 2 is configured to send a control signal to the screen 3 to control the content such as commodity information to be displayed on the screen 3. The rear shell 1 is provided with a solar panel 7, and a wiring groove 103 is formed on the rear shell 1 and extended to an end face of the front part of the rear shell 1. A lead 6 is arranged in the wiring groove 103, a power supplying terminal of the solar panel 7 is connected to a power source terminal of the control panel 2 through the lead 6, and the control panel is connected to the screen 3. During use, the solar panel 7 collects light energy and converts it into electric energy, and supplies the electric energy to the control panel 2 and the screen 3 for use, so as to ensure the control and display functions of the electronic shelf label.

The present disclosure adopts the solar panel 7 as a power source, so that the service life of the electronic shelf label is not limited by the battery capacity and can be prolonged. In addition, the electronic shelf label is small in volume and simple in structure, thereby improving the overall flexibility of the electronic shelf label, facilitating the mounting and position adjustment of the electronic shelf label, and achieving better applicability.

Further, the control panel 2 is provided with a direct power supplying module and a power storage module, both of which are connected to the screen 3. The solar panel 7 can directly supply power to the screen 3 through the direct power supplying module. The solar panel 7 can also store the electric energy in the power storage module, and supply power to the screen 3 through the power storage module when direct power supplying cannot be performed.

Figure 2:
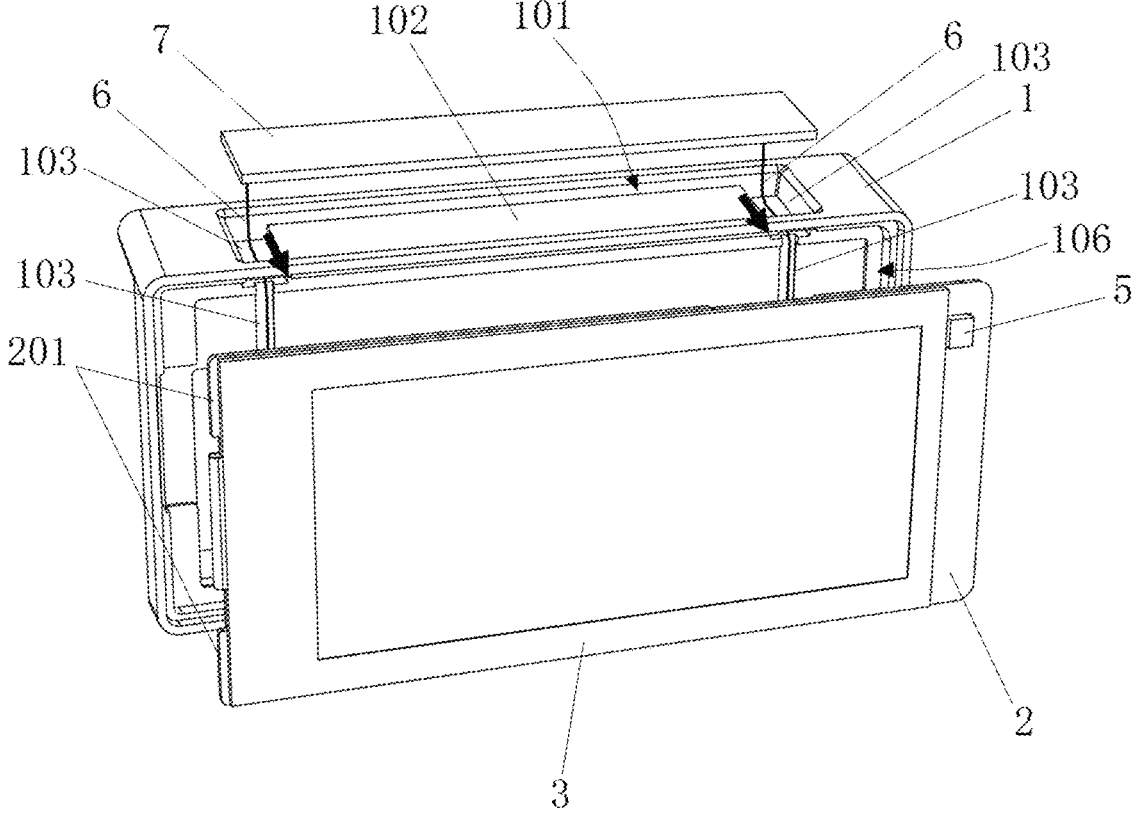
FIG. 2 illustrates a schematic diagram of mounting positions of a solar panel and a screen in a solar electronic shelf label of the present disclosure.
Figure 3:
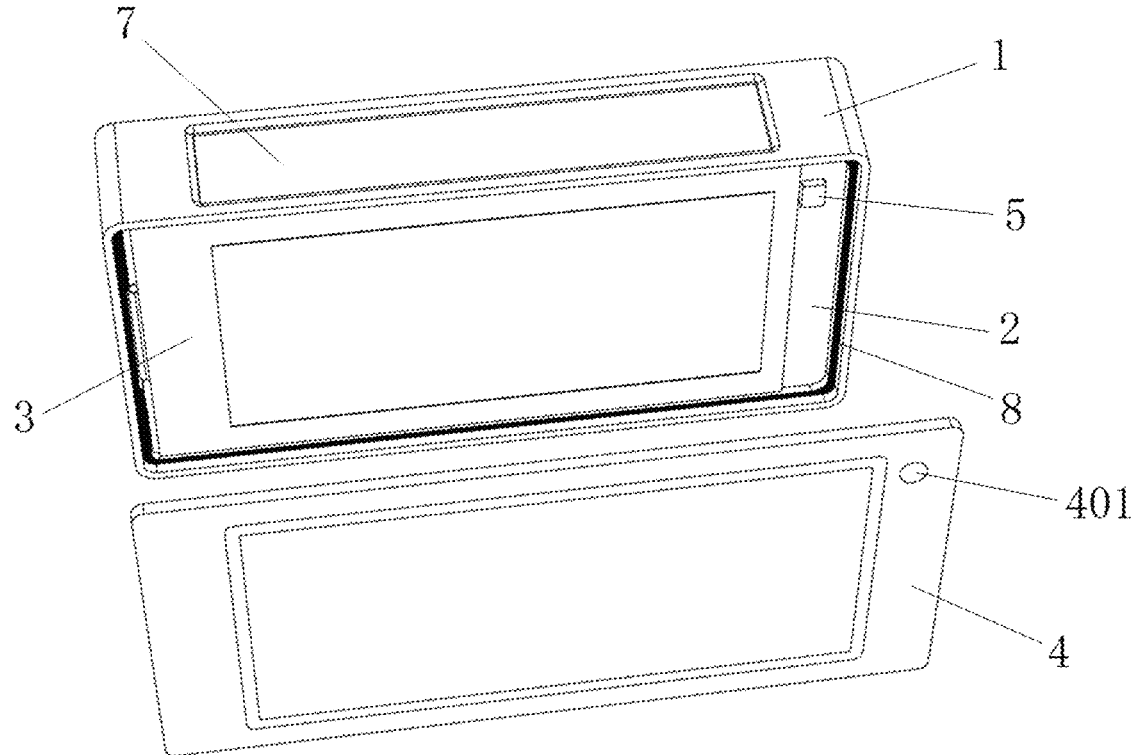
FIG. 3 illustrates a schematic diagram of a mounting position of a lens in a solar electronic shelf label of the present disclosure.

Specifically, as illustrated in FIGS. 1 to 3, the rear shell 1 is a plate-shaped structure disposed in a vertical direction, and an accommodating groove 106 is formed in the front part of the rear shell 1. A front end face of the control panel 2 is connected to a rear end face of the screen 3, and both the control panel 2 and the screen 3 are embedded in the accommodating groove 106 in the vertical direction, so that the control panel 2 and the screen 3 can be assembled and fixed in the rear shell 1 to improve the mounting stability of the control panel 2 and the screen 3.

Further, as illustrated in FIG. 2, two opposite edges of the control panel 2 are respectively provided with a plurality of first clamping blocks 201, an inner wall of the accommodating groove 106 is provided with first clamping grooves (not illustrated) fitted with the first clamping blocks 201, and each of the first clamping blocks 201 is clamped in the corresponding first clamping groove, so as to ensure that the control panel 2 and the screen 3 are stably mounted in the rear shell 1, and effectively prevent the control panel 2 and the screen 3 from shaking in the rear shell 1.

Further, a rear end face of the control panel 2 and the rear shell 1 may be bonded by but not limited to foam glue.

In an alternative embodiment of the present disclosure, as illustrated in FIGS. 1 and 3, the solar electronic shelf label further includes a lens 4, which is disposed at the front part of the rear shell 1, so that the control panel 2 and the screen 3 are interposed between the lens 4 and the rear shell 1, the screen 3 is protected by the lens 4, and consumers can view the contents displayed on the screen 3 through the lens 4.

Further, as illustrated in FIG. 3, the front part of the rear shell 1 is provided with a dispensing surface 8 along an edge of the front part, the dispensing surface 8 is coated with foam glue, and an edge of the lens 4 is bonded to the dispensing surface 8.

In an alternative embodiment of the present disclosure, as illustrated in FIGS. 1 to 3, the front end face of the control panel 2 is provided with an indicator light 5, and the lens 4 is provided with a display opening 401 at a position opposite to the indicator light 5. The indicator light 5 can indicate different sale states (e.g., promotion, low inventory, etc.) of corresponding commodities to the outside by changing colors, so that workers and consumers can acquire the state of commodities in time.

Further, the indicator light 5 may be, but not limited to, an LED light.

In an alternative embodiment of the present disclosure, as illustrated in FIGS. 1 to 3, a mounting groove 101 is provided at a middle position on a top of the rear shell 1, and has a shape and a size matched with those of the solar panel 7. A fixing table 102 is formed in the mounting groove 101 in a horizontal direction, the solar panel 7 is embedded and fixed in the mounting groove 101, and a bottom surface of the solar panel 7 is attached to a top surface of the fixing table 102. The solar panel 7 is embedded in the mounting groove 101 to form an integral structure with the rear shell 1. In addition, the fixing table 102 plays a role of supporting and positioning the solar panel 7, thereby ensuring stable installation of the solar panel 7 and improving the stability of the solar panel 7.

Further, the solar panel 7 and the rear shell 1 (i.e., the edge of the mounting groove 101) are bonded by foam glue, thereby fixing the solar panel 7.

In an alternative embodiment of the present disclosure, as illustrated in FIGS. 1 and 2, there are at least two wiring grooves 103, which are located in the mounting groove 101, disposed on two sides of the fixing table 102, respectively, and extended from the top of the rear shell 1 to the front end face of the front part of the rear shell 1. During wire routing, as illustrated in FIG. 2, the leads 6 may be inserted into the wiring groove 103 via the mounting groove 101 at the top of the rear shell 1, and the leads 6 are extended to the front end face of the rear shell 1 along the wiring groove 103, and then the leads 6 are connected to the control panel 2 that is connected to the screen 3 through a printed circuit board, thereby ensuring the normal use of the electronic shelf label.

Further, the lead 6 may be, but is not limited to, an enameled wire.

Figure 4:
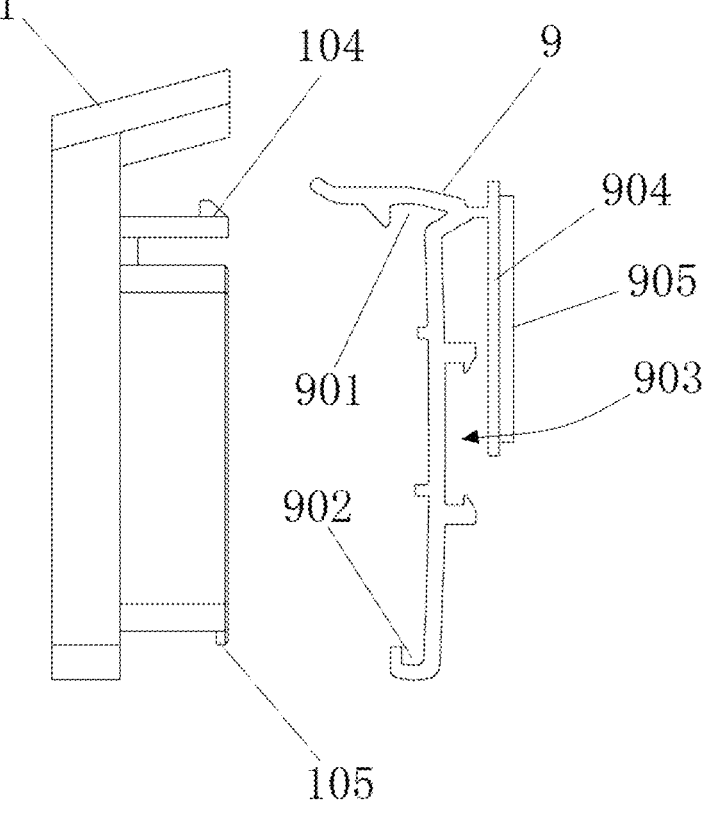
FIG. 4 illustrates a schematic diagram of a mounting position of a fixing piece in a solar electronic shelf label of the present disclosure.

In an alternative embodiment of the present disclosure, as illustrated in FIG. 4, the solar electronic shelf label further includes an assembling piece 9, a rear end face of the rear shell 1 is provided with a second clamping block 104 and a third clamping block 105 that is located below the second clamping block 104. A front end face of the assembling piece 9 is provided with a second clamping groove 901 fitted with the second clamping block 104, and provided with a third clamping groove 902 located below the second clamping groove 901 and fitted with the third clamping block 105. The second clamping block 104 is clamped with the second clamping groove 901, and the third clamping block 105 is clamped with the third clamping groove 902, so that the assembling piece 9 can be connected to the rear shell 1. In addition, the rear end face of the assembling piece 9 is further provided with a fourth clamping groove 903 (i.e., a mounting position for an angle adjuster) and a back-glue plate 904 for fixing the assembling piece 9. The assembling piece 9 is bonded to a mounting position through a bonding layer 905 (i.e., glue) disposed on the adhesive backing plate 904, and is clamped with the angle adjuster through the fourth clamping groove 903, so that the angle of the electronic shelf label can be adjusted according to actual needs, thereby completing the mounting and fixation of the electronic shelf label.

Those described above are only illustrative embodiments of the present disclosure, rather than limiting the scope thereof. Any equivalent change or modification made by persons skilled in the art without departing from the concept and principle of the present disclosure should fall within the protection scope of the present disclosure.

What is claimed is:

1. A solar electronic shelf label, comprising a rear shell, a front part of which is provided with a screen, wherein a control panel is disposed between the rear shell and the screen, and a control signal output terminal of the control panel is connected to a control terminal of the screen; and the rear shell is provided with a solar panel and is formed with a wiring groove extended to an end face of the front part of the rear shell, a lead is arranged in the wiring groove, the solar panel is connected to the control panel through the lead, and the control panel is connected to the screen.

2. The solar electronic shelf label according to claim 1, wherein the rear shell is a plate-shaped structure disposed in a vertical direction, an accommodating groove is formed in the front part of the rear shell, a front end face of the control panel is connected to a rear end face of the screen, and both the control panel and the screen are embedded in the accommodating groove in the vertical direction.

3. The solar electronic shelf label according to claim 2, wherein edges of the control panel are provided with a plurality of first clamping blocks, an inner wall of the accommodating groove is provided with first clamping grooves fitted with the first clamping blocks, and each of the first clamping blocks is clamped in the corresponding first clamping groove.

4. The solar electronic shelf label according to claim 2, further comprising a lens, which is disposed at the front part of the rear shell, wherein the control panel and the screen are interposed between the lens and the rear shell.

5. The solar electronic shelf label according to claim 4, wherein the front part of the rear shell is provided with a dispensing surface along an edge of the front part, and an edge of the lens is bonded to the dispensing surface.

6. The solar electronic shelf label according to claim 4, wherein the front end face of the control panel is provided with an indicator light, and the lens is provided with a display opening at a position opposite to the indicator light.

7. The solar electronic shelf label according to claim 2, wherein a mounting groove is provided on a top of the rear shell, a fixing table is formed in the mounting groove in a horizontal direction, the solar panel is embedded and fixed in the mounting groove, and a bottom surface of the solar panel is attached to a top surface of the fixing table.

8. The solar electronic shelf label according to claim 7, wherein the wiring groove is located in the mounting groove and disposed on two sides of the fixing table, and is extended from the top of the rear shell to the end face of the front part of the rear shell.

9. The solar electronic shelf label according to claim 1, wherein the lead is an enameled wire.

10. The solar electronic shelf label according to claim 1, further comprising an assembling piece, a rear end face of the rear shell is provided with a second clamping block and a third clamping block, the assembling piece is provided with a second clamping groove fitted with the second clamping block and a third clamping groove fitted with the third clamping block, the second clamping block is clamped with the second clamping groove, and the third clamping block is clamped with the third clamping groove; and the assembling piece is further provided with a fourth clamping groove and an adhesive backing plate for fixing the assembling piece.

11. The solar electronic shelf label according to claim 7, wherein the lead is an enameled wire.

12. The solar electronic shelf label according to claim 1, wherein a mounting groove is provided on a top of the rear shell, a fixing table is formed in the mounting groove in a horizontal direction, the solar panel is embedded and fixed in the mounting groove, and a bottom surface of the solar panel is attached to a top surface of the fixing table.

13. The solar electronic shelf label according to claim 12, wherein the wiring groove is located in the mounting groove and disposed on two sides of the fixing table, and is extended from the top of the rear shell to the end face of the front part of the rear shell.

14. The solar electronic shelf label according to claim 12, wherein the mounting groove is provided on a top plate of the rear shell, and the top plate of the rear shell is inclined upward in a direction from the end face of the front part of the rear shell toward a rear end face of the rear shell.

15. The solar electronic shelf label according to claim 14, wherein the rear end face of the rear shell is disposed in a vertical direction, and the rear end face of the rear shell is provided with a second clamping block and a third clamping block; and the top plate, the second clamping block, and the third clamping block are arranged at intervals in sequence from top to bottom along the vertical direction.

16. The solar electronic shelf label according to claim 1, wherein a top plate of the rear shell is provided with a mounting groove, and the solar panel is embedded and fixed in the mounting groove.

17. The solar electronic shelf label according to claim 16, wherein the top plate of the rear shell is inclined upward in a direction from the end face of the front part of the rear shell toward a rear end face of the rear shell.

18. The solar electronic shelf label according to claim 16, wherein the rear end face of the rear shell is disposed in a vertical direction, and the rear end face of the rear shell is provided with a second clamping block and a third clamping block; and the top plate, the second clamping block, and the third clamping block are arranged at intervals in sequence from top to bottom along the vertical direction.

* * * * *